(12) United States Patent
Garza, Jr.

(10) Patent No.: US 12,120,520 B2
(45) Date of Patent: Oct. 15, 2024

(54) DIGITAL CONTACT DATA MANAGEMENT AND DISTRIBUTION SYSTEMS AND METHODS

(71) Applicant: Justino Garza, Jr., McAllen, TX (US)

(72) Inventor: Justino Garza, Jr., McAllen, TX (US)

( * ) Notice: Subject to any disclaimer, the term of this patent is extended or adjusted under 35 U.S.C. 154(b) by 216 days.

(21) Appl. No.: 17/783,755

(22) PCT Filed: Jul. 28, 2021

(86) PCT No.: PCT/US2021/043452
§ 371 (c)(1),
(2) Date: Jun. 9, 2022

(87) PCT Pub. No.: WO2022/031495
PCT Pub. Date: Feb. 10, 2022

(65) Prior Publication Data
US 2023/0027966 A1 Jan. 26, 2023

Related U.S. Application Data

(60) Provisional application No. 63/062,914, filed on Aug. 7, 2020.

(51) Int. Cl.
| | |
|---|---|
| *H04W 12/30* | (2021.01) |
| *G06Q 10/109* | (2023.01) |
| *G06Q 30/0207* | (2023.01) |
| *G06Q 50/00* | (2012.01) |
| *H04L 67/306* | (2022.01) |

(52) U.S. Cl.
CPC .......... *H04W 12/30* (2021.01); *G06Q 10/109* (2013.01); *G06Q 30/0207* (2013.01); *G06Q 50/01* (2013.01); *H04L 67/306* (2013.01)

(58) Field of Classification Search
CPC ... G06F 16/9554; H04L 67/306; G06Q 50/01; G06Q 10/109
See application file for complete search history.

(56) References Cited

U.S. PATENT DOCUMENTS

| | | | |
|---|---|---|---|
| 9,760,645 B1* | 9/2017 | Park | G06K 19/06037 |
| 2011/0113084 A1* | 5/2011 | Ramnani | H04W 4/16 |
| | | | 709/201 |
| 2012/0197967 A1* | 8/2012 | Sivavakeesar | G06Q 50/01 |
| | | | 709/203 |
| 2013/0217365 A1* | 8/2013 | Ramnani | H04L 67/306 |
| | | | 455/414.1 |
| 2014/0064694 A1* | 3/2014 | Zealer | H04N 5/76 |
| | | | 386/230 |

(Continued)

OTHER PUBLICATIONS

International Search Report and Written Opinion of the International Searching Authority, International Application No. PCT/US2021/043452, dated Nov. 17, 2021.

*Primary Examiner* — Barbara B Anyan
(74) *Attorney, Agent, or Firm* — Victor H. Segura (57) ABSTRACT

Applications for creating, managing, and distributing digital contact data over large networks. Applications configured for implementation with electronic devices having touch-sensitive surfaces with displays, particularly mobile devices. Applications implemented with predictive keyboards for efficient, error-free searching of digital contact data and profiles. Applications for quickly sharing and distributing digital contact data over large networks via simple gestures over touch-sensitive surfaces.

13 Claims, 8 Drawing Sheets

(56) References Cited

U.S. PATENT DOCUMENTS

| | | | |
|---|---|---|---|
| 2014/0066044 A1* | 3/2014 | Ramnani | H04L 67/306 |
| | | | 455/418 |
| 2014/0108289 A1* | 4/2014 | Eitan | G06F 16/9554 |
| | | | 235/375 |
| 2016/0189120 A1* | 6/2016 | Bennett | G06Q 30/0207 |
| | | | 705/12 |
| 2018/0018631 A1* | 1/2018 | Aldridge | G06Q 10/109 |

* cited by examiner

DIGITAL CONTACT DATA MANAGEMENT AND DISTRIBUTION SYSTEMS AND METHODS

CROSS REFERENCE TO RELATED APPLICATIONS

Continuation of International Application No. PCT/US2021/043452 filed on Jul. 28, 2021. Priority is claimed from U.S. Provisional Application No. 63/062,914 filed on Aug. 7, 2020. Both foregoing applications are incorporated herein by reference in their entirety.

FIELD OF THE INVENTION

The present disclosure relates generally to the management, access, and distribution of digital information over a communication network.

BACKGROUND

Conventional digital contact information (e.g., business or personal contact information) software applications, including contacts on IOS™ and ANDROID™ platforms, are void of substantive contact information, usually containing only a contact's name and phone number. Although the capability of smart phone/mobile computing has expanded exponentially in recent years, there has been no viable solution for easily obtaining, saving, accessing, managing access and disseminating detailed contact and social media information from others in an efficient and streamlined manner, and with a system that works universally across conventional platforms such as IOS™ and ANDROID™. Thus, a need remains for improved techniques for easily obtaining, saving, accessing, managing access, distributing, and sharing this type of detailed information with others.

SUMMARY

A system to manage digital data according to an aspect of this disclosure includes an application configured to allow a user to create and control digital data for distribution to electronic mobile devices over a communication network. The system allows a user to enter digital image data for distribution to the electronic mobile devices; to enter digital card data for distribution to the electronic mobile devices, the digital card data including social media identifier data and personal or business contact data; to selectively allow access to entered digital image data and/or entered digital card data to others over the communication network; and to selectively remove access to entered digital image data and/or entered digital card data from others over the communication network. A software interface is configured to visually display, via one or more display windows on each electronic mobile device linked over the communication network, the entered digital image data and/or entered digital card data. The software interface is also configured to link to and visually display a social media page associated with the entered social media identifier data upon selection by a user from a display window on at least one of the electronic mobile devices.

In some embodiments, the software interface is configured to visually display a glossary, on a display window on the electronic mobile devices, of digital image data comprising images associated with users.

In some embodiments, the application is configured to allow a user to automatically remove access from everyone else on the communication network to the digital image data and/or digital card data entered by the user.

In some embodiments, the application is configured to allow a user to automatically allow access to everyone else on the communication network to the digital image data and/or digital card data entered by the user.

In some embodiments, the software interface is configured to visually display, on a display window on the electronic mobile devices, a keyboard and digital image data associated with an entry on the keyboard by a user.

In some embodiments, the digital card data associated with specific digital image data is displayed on the window on the electronic mobile devices upon selection by the user from the displayed digital image data.

In some embodiments, the software interface is configured to directly enable, upon selection by a user from the entered digital card data displayed on a window on the electronic mobile devices, other features resident on the respective mobile device including phone, email, and/or text messaging.

In some embodiments, the application is configured to trigger an indicator on an electronic mobile device of a user when the user is selected to receive the digital card data entered by another user.

In some embodiments, the software interface is configured to: display, on an electronic mobile device of a user, a glossary of images associated with calls and/or messages sent to the electronic mobile device; display the digital image data and/or digital card data associated with an image in the glossary upon selection of the image by the user, wherein the displayed data includes any social media identifier data associated with the respective digital card data.

In some embodiments, the software interface is configured to display, on an electronic mobile device of a user, a payment function identifier and/or an invoicing function identifier for selection by the user.

A method for managing digital data according to an aspect of the present disclosure includes providing an application configured to allow a user to: enter digital image data for distribution to electronic mobile devices over a communication network; enter digital card data for the distribution to the electronic mobile devices, the digital card data including social media identifier data and personal or business contact data; selectively allow access to entered digital image data and/or entered digital card data to others over the communication network; selectively remove access to entered digital image data and/or entered digital card data from others over the communication network; providing a software interface configured to visually display, via one or more display windows on each electronic mobile device linked over the communication network, the entered digital image data and/or entered digital card data; wherein the software interface is configured to link to and visually display a social media page associated with the entered social media identifier data upon selection by a user from a display window on at least one of the electronic mobile devices.

In some embodiments, the application is configured to, upon election by the user: automatically remove access from everyone else on the communication network to the entered digital image data and/or entered digital card data; or automatically allow access to everyone else on the communication network to the entered digital image data and/or entered digital card data.

In some embodiments, the software interface is configured to directly enable, upon selection by a user from the entered digital card data displayed on a window on the electronic mobile devices, other features resident on the respective mobile device including phone, email, and/or text messaging.

In some embodiments, the software interface is configured to: display, on an electronic mobile device of a user, a glossary of images associated with calls and/or messages sent to the electronic mobile device; display the digital image data and/or digital card data associated with an image in the glossary upon selection of the image by the user, wherein the displayed data includes any social media identifier data associated with the respective digital card data.

In some embodiments, the software interface is configured to display, on an electronic mobile device of a user, a payment function identifier and/or an invoicing function identifier for selection by the user.

BRIEF DESCRIPTION OF THE DRAWINGS

The following figures form part of the present specification and are included to further demonstrate certain aspects of the present disclosure and should not be used to limit or define the claimed subject matter. The claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown in generalized or schematic form, in the interest of clarity and conciseness. Illustrative embodiments of the invention are described below. In the interest of clarity, not all features of an actual implementation may be described in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

Embodiments of this disclosure provide for one-touch face-to-face trading of detailed contact and social media information between people at street level and through a variety of other means as described herein. Some embodiments provide for an easy-search, easy-access, and easy-connect to contacts though text, email, and/or through a variety of social media platforms. An advantage of disclosed embodiments is a software application that allows a user to quickly jump from a contact's social media page to another contact's social media page with one gesture, as further described herein.

Figure 1:
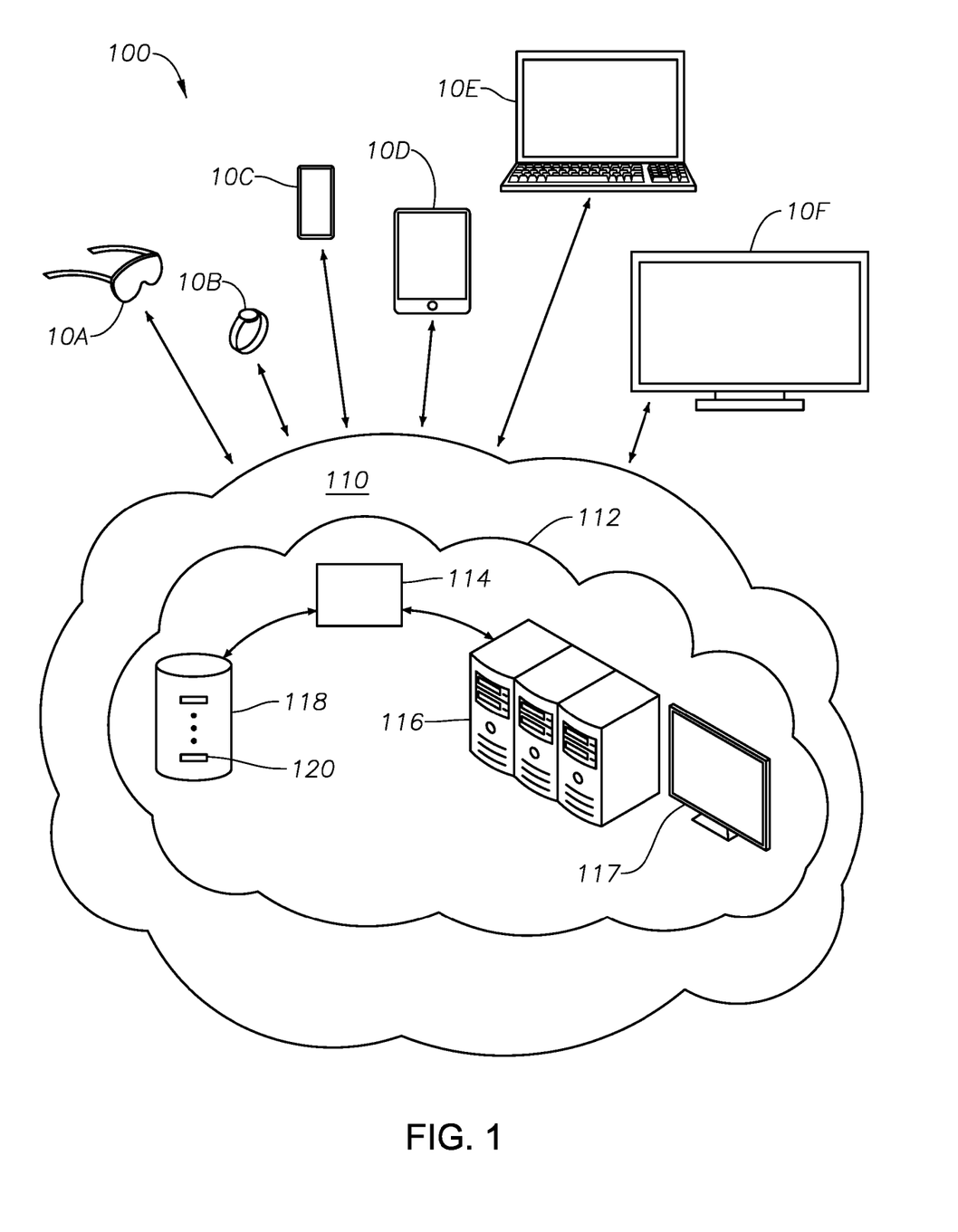
FIG. 1 shows a communication network configuration according to an example of the present disclosure.

FIG. 1 shows a system 100 consistent with example embodiments of this disclosure. The system 100 includes a communication network 110 that provides communication links between a plurality of electronic devices 10, including but not limited to a wearable computing device such as smart glasses 10A or a smart watch 10B, a mobile smart phone 10C, a tablet computer 10D, a desktop or laptop computer 10E, and smart TVs 10F. The electronic devices 10 are conventional devices equipped with a touch-sensitive surface including a visual display. In the case of smart glasses 10A, the display is a heads-up display and the touch-sensitive surface is replaced by click-activating blink modes as known in the art. In the case of smart TVs 10F, the screen may be a touch-sensitive surface or a conventional screen with a hand-held cursor device.

The communication network 110 may be the Internet, an intranet, a wired or wireless network, a Wi-Fi network, a cellular network, other types of communications networks, or any combination thereof. The system 100 includes back-end architecture 112 including an application module 114, infrastructure 116, and a database 118. The back-end architecture 112 may be implemented as a unitary structure (e.g. central server at a main office) or as a cloud-based architecture. Use of the term "cloud" in this context refers generally to conventional cloud computing, which is a paradigm of computing in which dynamically scalable and often virtualized resources may be provided as a service over the network 110. Embodiments of this disclosure incorporate the communication network 110 to provide combinations of software platforms and technologies to implement the techniques described herein.

The software constructs enabling the application embodiments of this disclosure reside in the application module 114. Embodiments of the software code may be implemented using conventional programming languages as known in the art (e.g., JAVA™, PYTHON™, C, C++, etc.). It will be appreciated by those skilled in the art that the application module 114 may be implemented with a single software program or a group of programs designed to perform the activities of the disclosed embodiments. The infrastructure 116 may be implemented with conventional computer hardware (e.g. server systems) situated in one location or via a distributed cloud-based network. Similarly, the database 118 may be implemented using conventional memory constructs (e.g., local memory, virtual memory, and/or cloud-based memory).

Figure 2:
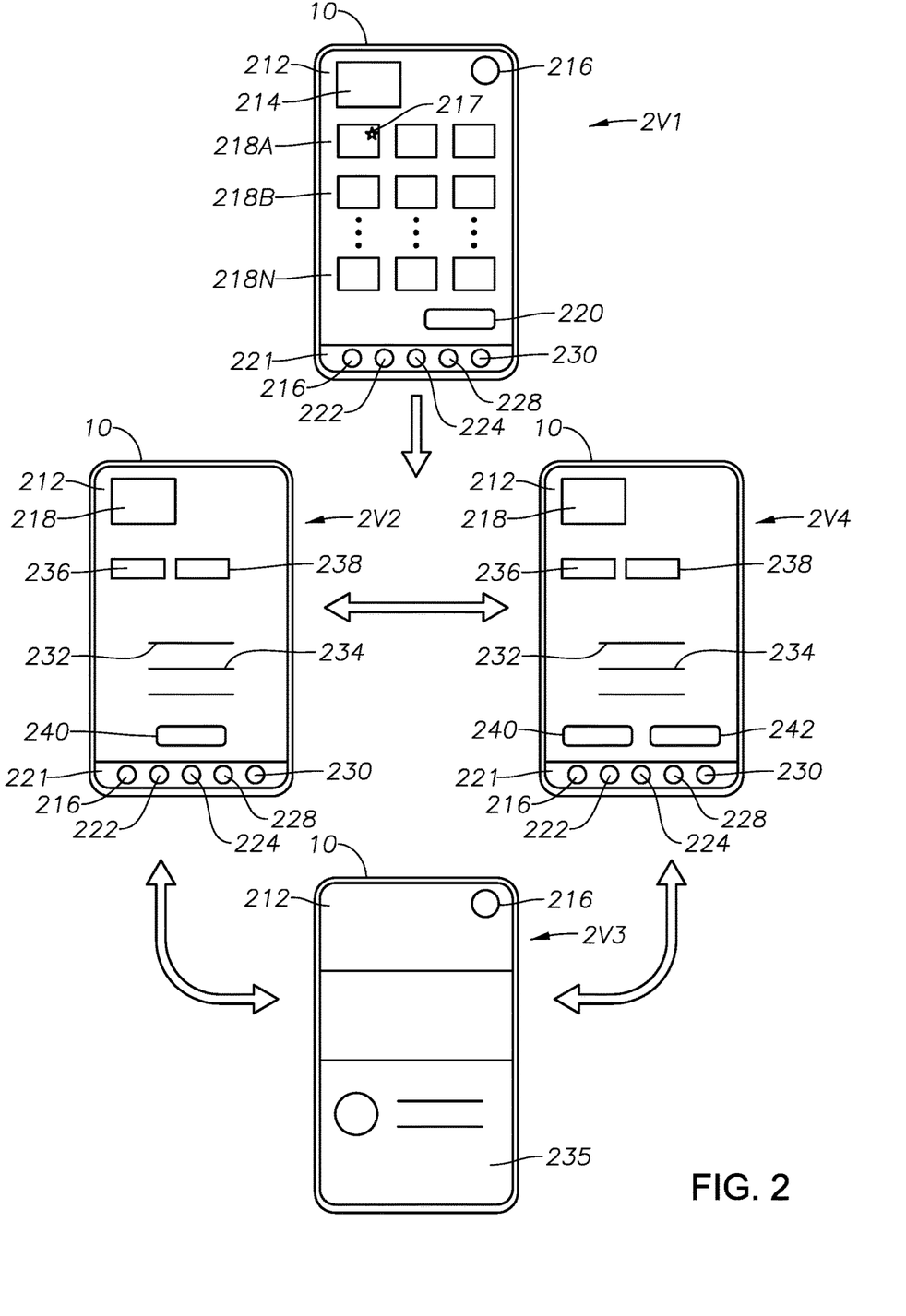
FIG. 2 shows screen views of application embodiments according to an example of the present disclosure.

Embodiments of this disclosure enable effortless management, sharing, distribution, and access of contact information and connection with contacts. FIG. 2 shows a series of screen views from an electronic device 10 (e.g. a smart phone) with a touch-sensitive surface and display 212. Although a smart phone 10 is shown, any electronic device 10 as described herein may be used in embodiments of this disclosure. FIG. 2 screen view 2V1 shows a main or home page displayed when the application is activated. In some embodiments, the home page includes a picture 214 selected by a user (e.g., the owner of the electronic device 10). The picture 214 may be any image or icon selected and uploaded by a user. By making a gesture over the picture 214, the user's own digital cards will automatically be displayed (as further described below). As used herein, the term "gesture" will be understood to mean any of the simple hand or stylus movements or positions used to activate or trigger a function via a conventional touch-sensitive surface (e.g., a finger swipe, tap, or press). Similarly, "touch-sensitive surface" embodiments of this disclosure also encompass conventional surfaces that are activated or operated without requiring direct physical contact (e.g., light-beam sensitive, near-contact sensitive (i.e. hovering motion), etc.).

A application icon 216 is also displayed on the home page. Similar to the well-known "bird" icon used to identify the TWITTER™ application, the application icon 216 is used to identify embodiments of the disclosed application. In some embodiments, the application icon 216 is also a functional tag that provides certain features, as further described below.

The home page also displays a number of images 218 arranged in a grid pattern of columns and rows 218A, 218B, . . . 218N. Each image 218 is associated with a distinct individual entered as a contact by the application user. In some embodiments, each image 218 also includes the name of the contact depicted with the respective image. As further described below, the images 218 may be an icon, a photo, or other visual depiction provided by, or representative of, the respective contact. The contact image 218 grid may display a number of images (e.g. 10-15 on a standard smart phone) depending on the display size. A "Search" tag 220 is also shown on the display 212. This tag 220 enables a customized keyboard for conducting searches among the available contacts (further described below). Proximate the bottom of the display 212 is located a tool bar 221 with several commonly-used tags 216, 222, 224, 228, 230 that enable other features as further described herein.

From the home page, a user can quickly and easily obtain the detailed information associated with any individual in the displayed contact image 218 glossary. It will be understood that although the description herein is focused on information relating to individuals, embodiments of this disclosure also encompass contacts wherein the underlying data is associated with entities other than people (e.g., businesses, locations, etc.). In response to detecting a gesture over a selected image 218 from the glossary of displayed contact images 218A, 218B, . . . 218N, a digital card associated with the selected image is displayed.

In some embodiments, the images 218 are automatically displayed in the home page glossary in alphabetical order. Embodiments also provide a user the ability to selectively designate a contact as a favorite for higher placement in the glossary order. For example, each contact image 218 can be configured with a non-intrusive toggle 217 (e.g., a small badge or star) that designates the image as a favorite by a simple gesture. Upon activation as a favorite via a gesture over the toggle 217, the toggle darkens in color and the contact image 218 is automatically placed higher in the glossary order. To return a favorited contact image 218 to non-favorite status, another gesture is made over the toggle 217 and the toggle returns to a lighter color. The number of favorites is unlimited. The images 218 may also be enlarged or reduced in size on the display via a settings tab further described below. Favorites are automatically displayed in the home page glossary in the order of most frequently used. The term "most frequently used" means those contacts whose images 218 are most frequently selected for any reason, including but not limited to calling, texting, messaging, visiting social media, mapping, or use of other functions provided by embodiments of the disclosed application (e.g. a payment function).

Embodiments of this disclosure entail different digital cards containing specific information and providing specific data handling features. One digital card is designated as a "Social Card." Screen view 2V2 shows an example digital Social Card or page embodiment. Making a gesture over any image 218 in the glossary on the home page (2V1) opens the selected contact's digital Social Card. If no Social Card is available, another digital card is opened as available. In the embodiment of screen view 2V2, the display 212 includes the image 218 of the selected contact. The Social Card may contain extensive information 232 relating to the selected contact, such as name, phone number(s), address(es) with auto GPS search, email, YOUTUBE™ video links, etc. This digital card may also contain personal social media identifier information 234 (e.g., personal FACEBOOK™, INSTAGRAM™, TWITTER™, SNAPCHATT™, LINKEDIN™, or any other social media). This is the type of information that an individual may typically give to close social friends or family. Having all of this data in one digital card or page allows a user to easily and rapidly access the desired contact and browse through or enable associated social media as desired. In addition to a standard phone or email identifier, this digital card allows one to immediately open and enable any listed social media portal without having to exit the application or transfer to another screen or site. In response to detecting a gesture over a social media identifier datum of the social media identifier data 234, the link is enabled and the respective social media page is opened. The application icon 216 is also included as one of the tags on the tool bar 221. A gesture over the application icon 216 on the tool bar 221 returns to the home page 2V1 for selection of another contact from the image 218 glossary.

Screen view 2V3 shows an example social media page 235 opened as a result of a gesture made over a social media identifier datum 234 from the digital Social Card 2V2. Once there, a user may enable or open the particular social media or other selected application as desired (e.g., phone, email, text). If desired, a user may return to the previous page (the Social Card in this particular example) via a standard swipe-back gesture or via a previous-page tag.

Another digital card may be designated as a "Business Card." Screen view 2V4 shows an example digital Business Card or page embodiment. In this embodiment, the display 212 includes the image 218 of the selected contact. The Business Card may also contain extensive information 232 relating to the selected contact, such as name, phone number(s), address(es) with auto GPS mapping, email, etc. However, the type of information contained in this digital card is typically information more suited for business promotion. This digital card may also contain personal social media identifier information as well as business information and social media identifiers 234 designed for business purposes. Like the Social Card, embodiments of the Business Card allow one to immediately open and enable any listed social media portal without having to exit or transfer to another site. In response to detecting a gesture over a social media identifier datum of the social media identifier data 234, the link is enabled and the respective social media page is opened and displayed (e.g. screen view 2V3). Other embodiments may include additional digital cards. For example, another digital card may be generated and designated as a "Limited Card." As the title implies, such a card may be populated with very limited information (e.g., only name, phone number, email). This digital card is the type of card a user may give to a stranger.

Embodiments of the digital cards may also be configured with screen views 2V2, 2V4 including menu tags to visually indicate to the user which digital card is being displayed and to allow one to flip between cards with a simple gesture over the respective tag. For example, a Social Card menu tag 236 may be shown next to a Business Card menu tag 238 on the display 212. Such tag 236, 238 placement facilitates switching back and forth between digital cards by simply making a gesture over the respective tag. In essence, the menu tags 236, 238 provide instant access to different address books, one for friends and family, one for business promotion, and other tags for address books as may be desired by the user. Embodiment permit the user to swipe back and forth between a Social Card and Business Card.

The creation of digital cards can be implemented in different ways. Some embodiments of this disclosure provide an autofill function to populate a digital card-create field using the data (e.g., name, address, phone number, email) resident or native on the electronic device 10. Such embodiments automatically draw the data from the existing conventional repository on the device 10. Manually typing in the data is always an option with embodiments of the application. In addition to base information, embodiments also provide an autofill function that automatically populates a digital card with native social media and other application source identifiers (e.g. URLs). Embodiments may also be implemented providing users the ability to create digital cards manually or by autofill via a website linked to the communication network 110 (e.g., website 117 resident on the back-end architecture 112). Embodiments also provide the ability for users to import pictures, for display on the digital cards and other application displays, from the native picture gallery on the device 10 or from other locations (e.g. via a remote photo repository). Upon creation, the digital cards are given a unique identifier (item 120 in FIG. 1) and saved in the database 118 (FIG. 1). In some embodiments, a quick response (QR) code is automatically generated and used as the unique identifier 120 associated to a digital card for identification and location of the card.

Digital card management is made easy by embodiments of this disclosure. Digital cards can be easily and selectively deleted by a user. Each digital card can be configured to include a "Manage Card" tag 240, as shown for example in Social Card screen view 2V2. When this tag 240 is activated via a gesture, a "Delete Card" prompt is shown on the display 212 offering the user the ability to delete the respective contact's card via a gesture over the prompt. This delete feature is one of the delete options provided by embodiments of the application, allowing a user to delete a particular digital card from their directory. Other digital card delete options are further described herein.

Digital card distribution is also made easy. In some embodiments, a user may give or share their own digital card(s) with others by merely making a gesture over a "Sharing" tag 230 located in the tool bar 221. When this tag 230 is activated via a gesture, a share page is displayed, as shown for example in screen view 3V1 of FIG. 3. A list of the user's own digital card titles (e.g. Social Card 302, Business Card 304, Private Card 306) is then displayed, each with its own sliding-switch tag 308. A user can select which of their own digital cards to share by selectively enabling the respective sliding-switch tags 308. Once the desired digital card(s) is selected for sharing with others, a gesture over a "Share" tag 310 opens a page with various options, as shown for example in screen view 3V2.

Figure 3:
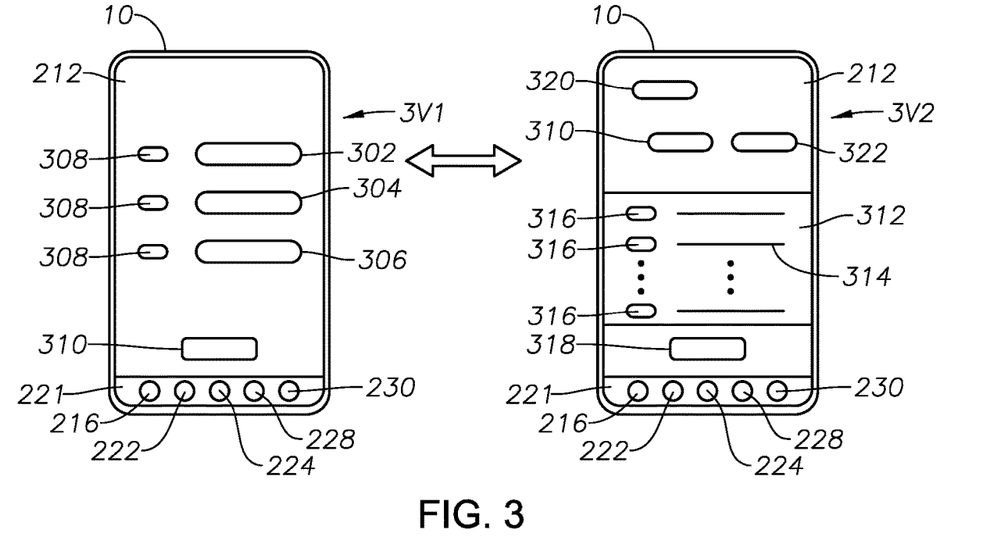
FIG. 3 shows screen views of application embodiments according to an example of the present disclosure.

An advantage of the disclosed application is the ability to distribute or share digital cards with every contact with one simple gesture, or to selectively choose from among the contacts with minimal action. As shown in screen view 3V2, after the digital card(s) to be shared has been selected, one option for distribution is to share the card(s) with every contact by a simple gesture over a "Select All" tag 310. Activating this tag 310 triggers distribution of the selected digital card(s) to every contact under the user's contacts via the network 110 as described herein. Some embodiments include a listing 312 of the contacts from the contact directory to allow a user to selectively pick and choose among the contacts with whom to share the digital card(s). One embodiment displays a list 312 of the individual contact names and phone numbers 314, each with its own sliding-switch tag 316. A user can select which specific contacts to share the digital card(s) with by enabling the respective sliding-switch tag 316 beside each entry. Once the desired contacts are selected as described above, a gesture over a "Share" tag 318 activates distribution of the digital card(s) over the network 110. Some embodiments also include a Search tag 320 for conducting searches among the contacts in the image 218 glossary. Activation of the Search tag 320 via a gesture opens a customized keyboard on the display 212 to allow a user quick-searching capability among the contacts.

Figure 4:
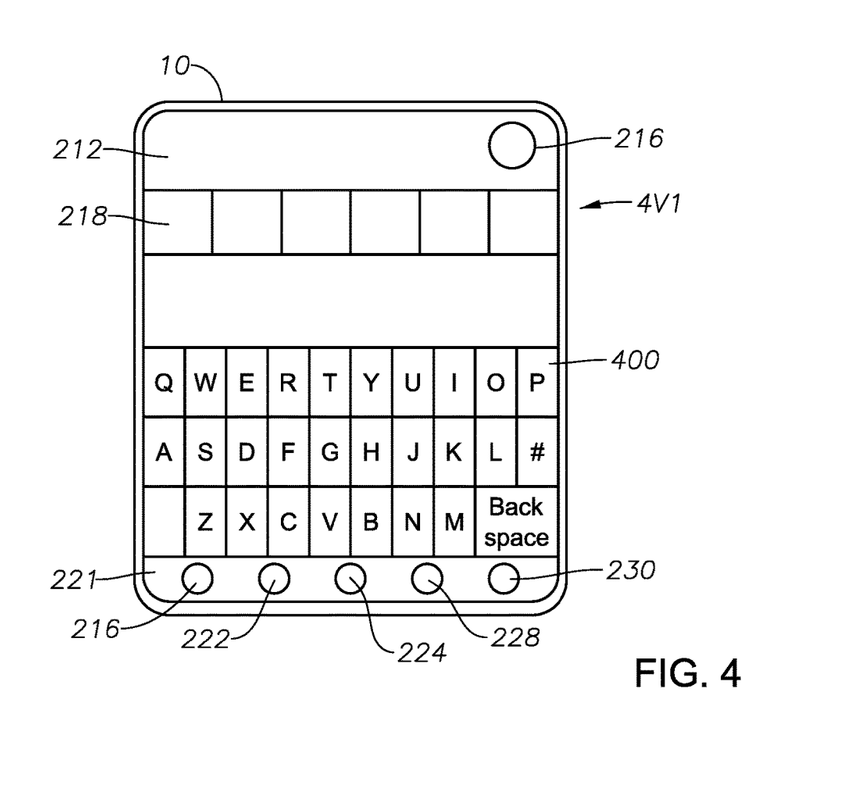
FIG. 4 shows a screen view of an application with a keyboard embodiment according to an example of the present disclosure.

FIG. 4 shows a screen view 4V1 of a customized digital keyboard 400 of an application embodiment of this disclosure. In this embodiment, the keyboard 400 provides an abbreviated display including the 26 letters of the alphabet, a backspace key, and a # symbol key. The electronic device 10 display 212 also shows the contact images 218 displayed as a result of the search entry on the keyboard 400. Each contact name is also displayed with the contact image 218. A user can swipe on the contact images 218 to go forward or backward on the displayed contact images. Some embodiments may display a multi-row, multi-column grid of contact images 218 resulting from the search query. In such embodiments, a user can also gesture scroll up, down, left, or right through the displayed contact images until the desired contact is found. Once the desired contact is found, a gesture over the image 218 will open the respective contact's digital cards as described herein.

While conventional application search engines utilize coding that requires "find words that contain" a particular letter, search engines of the disclosed application utilize coding that entails "find words that start with" a particular letter. In this manner, when the first letter is selected on the keyboard 400, the application looks for first names or last names or business names that begin or start with the particular selected letter, instead of seeking the typed letter in the middle of a word.

Figure 5:
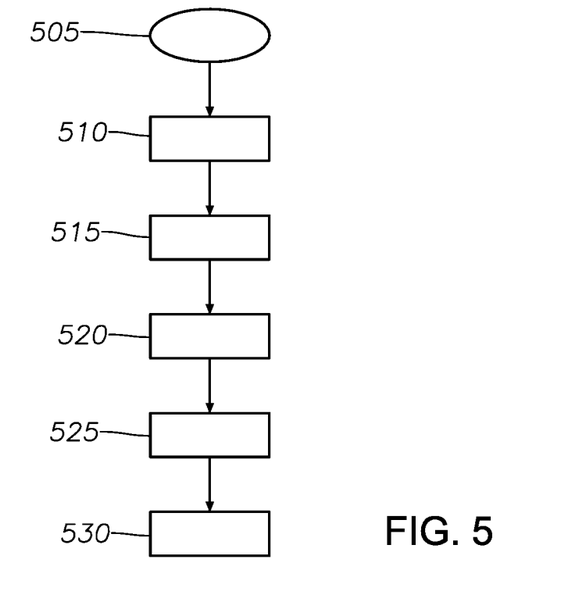
FIG. 5 shows a flow chart of a data searching/filtering algorithm according to an example of the present disclosure.

A typical contact search does not require more than three letter keys to complete the search. Therefore, some embodiments provide a digital predictive keyboard 400. FIG. 5 depicts a flow chart 500 of an algorithm for a predictive keyboard implemented with some application embodiments. Once a user enters the first letter of the contact name/designation on the keyboard 400 via a gesture, the images 218 of all the contacts responsive to that letter are shown on the display 212 in alphabetical order (see FIG. 4). If the searched contact image 218 appears after entry of the first letter, the search is over and the user can access the contact's digital card and perform any of the actions as disclosed herein. However, at step 505, in the background an application algorithm automatically creates a list of the contacts in the user's directory that were responsive to the first letter selection. For example, if the first letter entered on the keyboard 400 is an "S," then all names in the user's contacts beginning with "S" are compiled into a list in alphabetical order (the "S-List"). At step 510, the algorithm considers each entry on the S-List and deciphers all of the letters that appear as the second letter in that group of contacts. For example, after considering the S-list only four letters (A, E, I, T) are found to appear as the second letter. At step 515, since this set of possible second letters is necessary to continue the search in the directory, those specific letters are emphasized on the keyboard 400 display. The second-letter set (A, E, I, T in the described example) can be emphasized in several ways on the predictive keyboard 400 (e.g., by color, bolding, darkened border, texture, size, a combination of these, etc.). In some embodiments, the rest of the "unnecessary letters" could become fuzzy or disappear in the background. Continuing with the example, if the second letter selected is "E," the algorithm then determines each entry in the contact directory beginning with the letters "SE" and compiles a list of all those contacts in alphabetical order (the "SE-List"), step 520. At step 525, the algorithm considers each entry on the SE-List and deciphers all of the letters that appear as the third letter in that group of contacts. For example, after considering the SE-list, only two letters (I, T) are found to appear as the third letter. At step 530, since this set of possible third letters is necessary to continue the search in the directory, those specific letters are emphasized on the keyboard 400.

Figure 6:
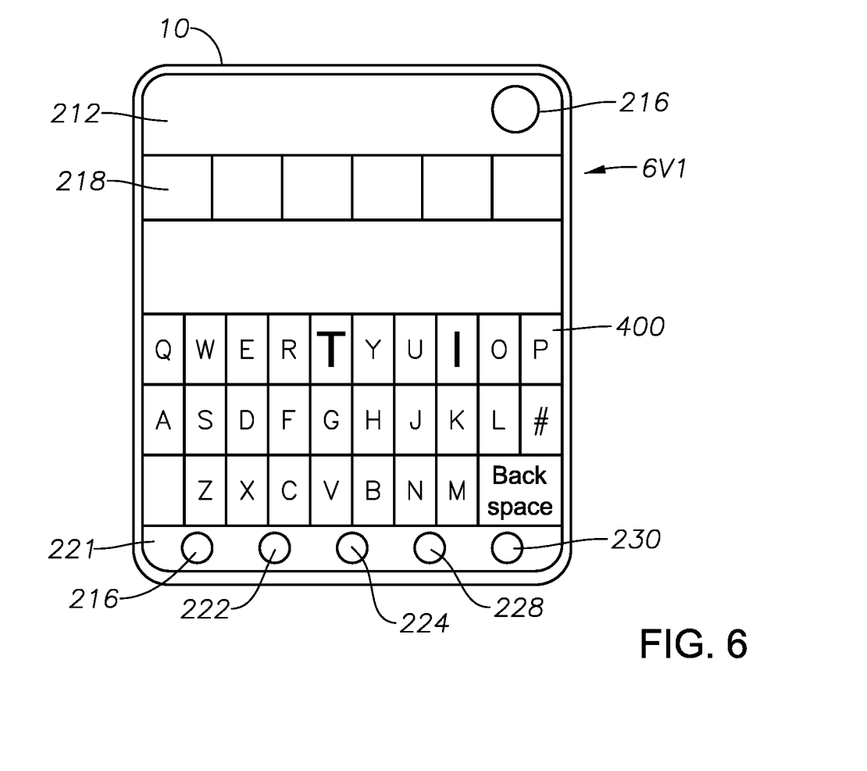
FIG. 6 shows another screen view of the application with a keyboard embodiment of FIG. 4.

FIG. 6 shows screen view 6V1, illustrating the letters "I" and "T" enlarged and in bold on the predictive keyboard 400 display, while all of the other letters are shown in barely visible light grey scale since they cannot be utilized because no contact name in the directory has those letters as the third letter in any name. As the iterations are performed, the contact images 218 on the display 212 keep changing to reflect the possible query results. Embodiments of the predictive keyboard 400 will facilitate contact searching, making it faster and error-free by preventing mistakes related to poor eyesight or small-key issues.

Figure 7:
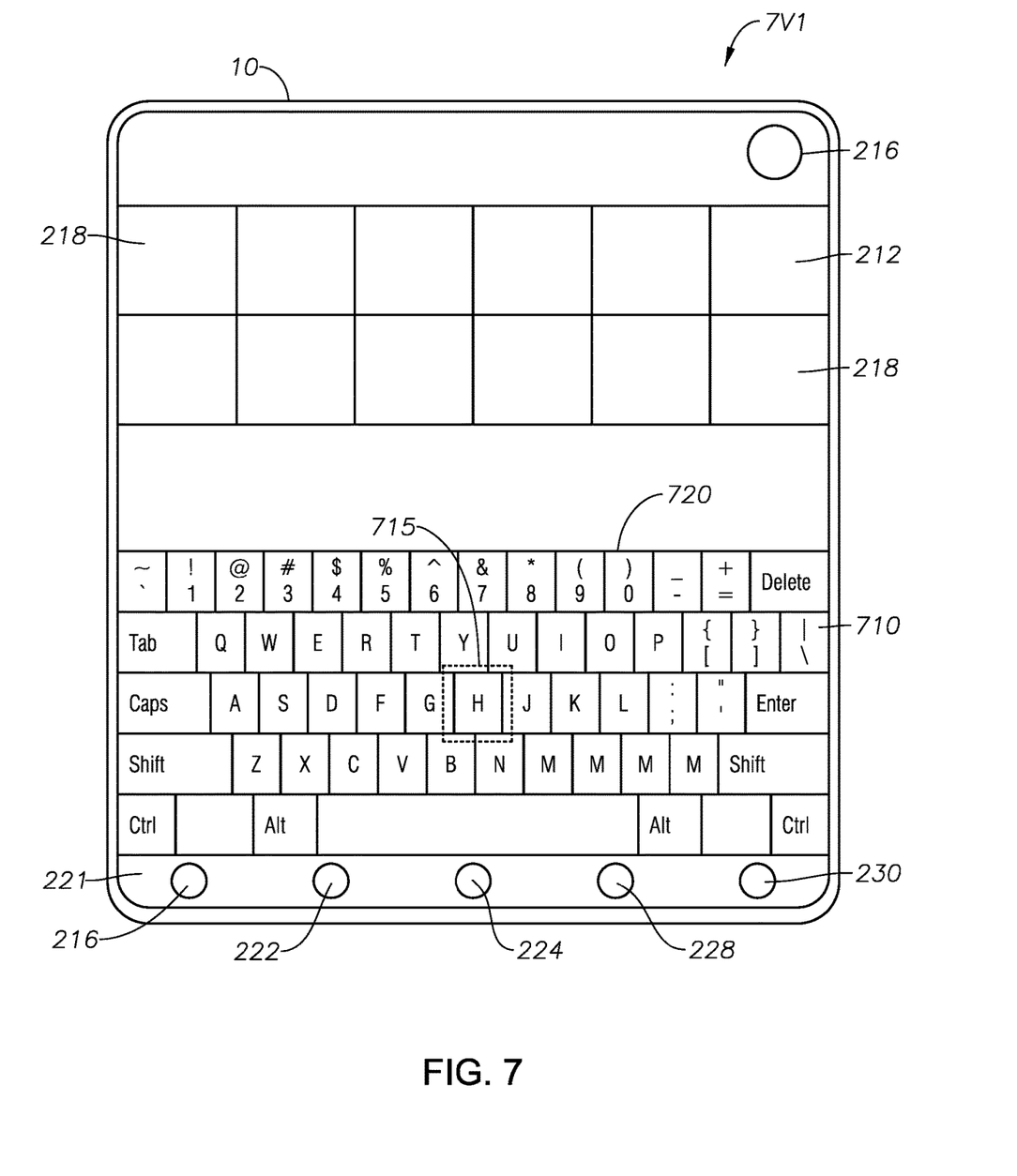
FIG. 7 shows another screen view of an application with a keyboard embodiment according to an example of the present disclosure.

In some embodiments, the user has the option to use either the predictive keyboard layout disclosed herein or a conventional digital QWERTY keyboard layout. The user can select which keyboard to use through the Settings tab 228 on the tool bar 221. FIG. 7 shows a screen view 7V1 of a QWERTY keyboard 710 displayed on the device 10 screen 212. In this embodiment, the keys 700 visually appear the same size and are not emphasized on the keyboard 710 as occurs with the predictive keyboard (FIG. 6). However, the application algorithm disclosed above (500 in FIG. 5) still performs the described iterations in the background. The algorithm 500 still determines which letters are necessary to continue a contact search. For those letters that the algorithm 500 determines to be necessary to complete a search, the gesture responsiveness area 715 (i.e., to touch, press, hover, light sensitivity) of the keyboard 710 display is expanded and extends beyond the "visible boundaries" of the keys 700. As shown in screen view 7V1, the responsiveness area 715 of the letter "H" (for an example search query) on the keyboard 710 display has been enlarged, providing a larger touchpoint for the user to select the necessary key. The enlarged responsiveness area 715 is invisible to the user. The key 700 boundaries 720 appear uniform on the display. Such embodiments will facilitate contact searching, making it faster and error-free by preventing mistakes related to poor eyesight or small key issues. It will be appreciated that embodiments of the disclosed application (whether configured with a predictive keyboard or a standard QWERTY keyboard) may be configured with algorithms to perform the disclosed functionalities using other languages besides the modern English alphabet. In such embodiments, the keyboard 400, 710 will be configured with the appropriate symbols or characters pertaining to the alphabet of the respective language.

Figure 8A:
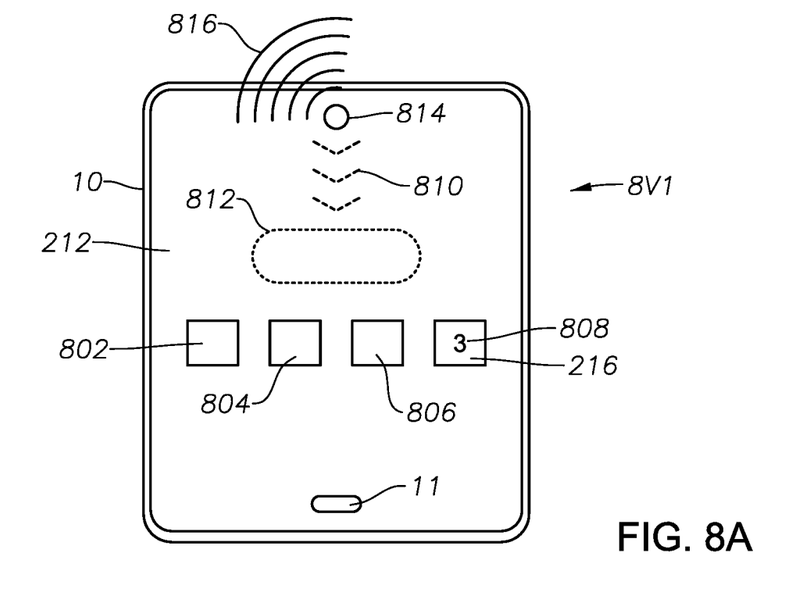
FIG. 8A shows a screen view of an application embodiment according to an example of the present disclosure.

The distribution and sharing of digital cards is a seamless process between users of the application embodiments. Once a user elects to share a digital card (as described herein) with another contact that is also a user of the application, the receiving user will automatically receive a notice that a digital card has been sent. Turning to FIG. 8A, an example screen view 8V1 of an electronic device 10 configured with a number of different software applications is shown. Each application is represented by a respective application icon 802, 804, 806 residing on a base or main page display 212 of the electronic device 10. Application icon 216 is also shown residing on the main page display 212. In some embodiments, an application user that has been sent a digital card (as described herein) will receive a visual indication of such an event without having to open the application. The visual indication can be any discernible feature (e.g., highlighting, darkened border, change in coloration, etc.) associated with the application icon 216 displayed on the various screen views as disclosed herein. An embodiment can be implemented wherein a number 808 appears on the application icon 216. The number 808 can represent the actual number of digital cards pending acceptance by the application user. For example, if a user has three digital cards (sent by others) in the queue waiting acceptance, the numeral "3" appears over the application icon 216, as shown in FIG. 8A. In some embodiments, the number 808 indicator can appear on the application icon 216 in the different screen displays enabled when the application is open. Other embodiments may be implemented wherein a notice 810 drops or floats across the display 212 with a temporary visual indicator 812 to alert the user a digital card has been received. Yet other embodiments may be implemented with an audible indicator wherein a sound 816 briefly emanates from the device 10 speaker 814 to indicate a digital card has been received.

Figure 8B:
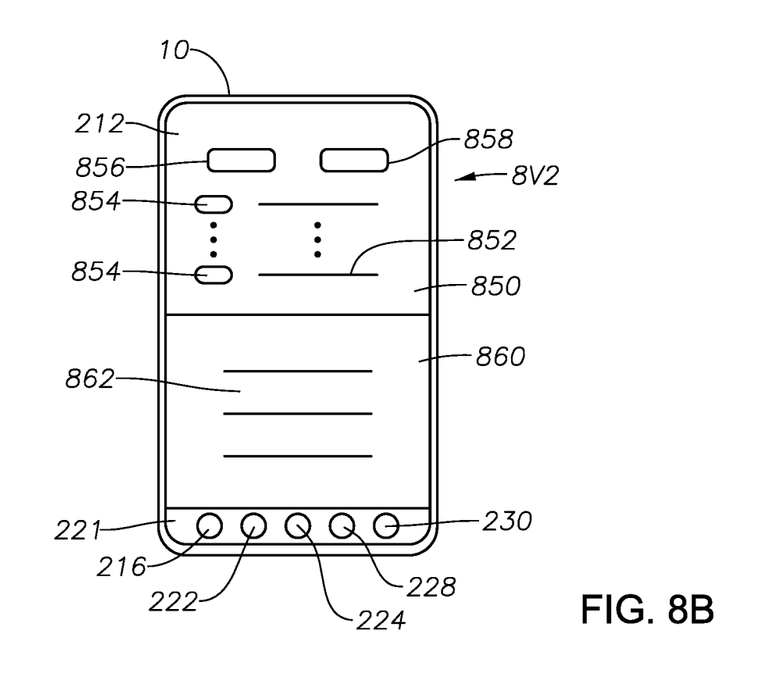
FIG. 8B shows a screen view of an application embodiment according to an example of the present disclosure.

Upon receipt of a notification as described above, a user can gesture over the application icon 216 to open a notification center page as shown, for example, in screen view 8V2 of FIG. 8B. A section 850 of the screen 212 displays an abbreviated entry 852 of each pending digital card, including base information (e.g. name, phone, email). Each entry 852 also has its own associated sliding-switch 854. If desired, a user can preview the entire digital card information via a simple gesture over the respective entry 852. A user can elect to accept and download all received digital cards at once, to delete all at once, or to accept/delete each card individually. "Accept All" tag 856 enables acceptance of all pending digital card entries 852 at once. "Delete All" tag 858 enables deletion of all pending digital card entries 852 at once. Each sliding-switch 854 enables selective acceptance or deletion of the respective entry 852. Upon gesturing over a sliding-switch 854, the user is prompted to accept or delete the respective digital card. If accepted, the received digital card will become an entry in the recipient's contacts stored in the database (118 in FIG. 1) and the received contact is added to the image 218 gallery. When a user opens the application via a gesture over the application icon 216 on the main page display 212, screen view 2V1 of FIG. 2 is displayed to provide access to the contact image 218 directory as described herein. Screen view 8V2 also shows another section 860 of the screen 212 displaying invoicing data (further described below).

Digital cards can also be shared with individuals that are not in the user's contact glossary (e.g., a newly met individual). Returning to screen view 3V2 of FIG. 3, embodiments may also include a "Share with others" tag 322. When this tag 322 is activated via a gesture, the user is prompted to enter the contact data (e.g. phone number, email) of the new desired contact. Once the contact data is entered, a user can share the desired digital card(s) with the new individual as described herein.

Screen view 2V4 of FIG. 2 shows an embodiment of the digital Business Card including a "Share" tag 242. Just as traditional physical business cards can be passed to others, embodiments of this disclosure facilitate the distribution of business information to a large number of people. Share tag 242 provides a user the option to distribute and share the digital Business Cards from the same display 212. For example, if a user opens a digital Business Card from among the contacts, the user can share that card with any or all of the other contacts by a simple gesture over the Share tag 242. Upon activating the tag 242, a page opens to offer the user various options for sharing the selected digital Business Card. In some embodiments, activating tag 242 will display screen view 3V2 of FIG. 3, which offers the digital card distribution and sharing options described herein.

Figure 9:
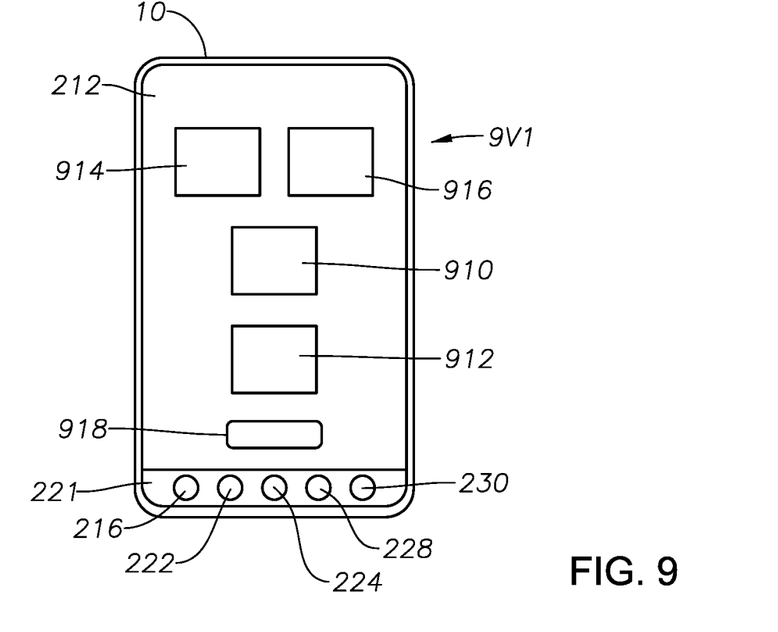
FIG. 9 shows a screen view of an application embodiment according to an example of the present disclosure.

As previously described with respect to the creation of digital cards, in some embodiments a QR code is automatically generated and used as a unique identifier 120 (FIG. 1) associated to a digital card for identification and location of the card in the database 118. The use of QR codes enables other modes for sharing and distributing digital cards. For example, a user can activate a QR code tag 222 on the tool bar 221, which will display the user's unique QR codes, as shown in screen view 9V1 of FIG. 9. For example, as illustrated in FIG. 9, a user having a digital Business Card and a digital Social Card can share either or both unique Social Card QR code 910 and unique Business Card QR code 912 with others by simply displaying the code on the electronic device 10 display 212 for scanning by the recipient's device. The individual QR codes 910, 912 can be enlarged on the display 212 by a simple gesture over the respective code. Users can also print or send their QR codes 910, 912 to others via email or text. However, Social Card QR codes 910 are not sent to a recipient's device upon scanning as Social Cards cannot be shared or distributed by anyone other than the digital card owner. A gesture over "Build Card" tag 918 opens a page with preset fields for users to input the data they desire to create and add new digital cards (e.g. Social, Business, Private) for use with the application.

Sharing of digital cards in this manner is a seamless process between users of the application embodiments. Since the individual QR codes are maintained in the database 118, upon scanning an application user's QR code, the receiving user will automatically receive the digital card associated with the respective code over the network 110 and it will become an entry in the recipient's notification center (FIG. 8B, screen view 8V2), and if accepted would be transferred into the user's contact directory. Only one user needs to scan a QR code. The application will recognize the users engaged in the exchange and thereby automatically complete the trade.

Embodiments of this disclosure also encompass the sharing and distribution of contact data between application users and non-users. As shown in screen view 9V1 of FIG. 9, embodiments may also include QR codes linked to the application software for download to electronic devices 10. Unique QR codes 914, 916 are provided for downloading the application software for use on devices 10 configured with different conventional operating platforms (e.g. ANDROID™, iOS™). Embodiments of the disclosed software application may be made available for download by anyone from conventional digital distribution portals (e.g. GOOGLE PLAY™ APP STORE™). In some embodiments, the software application may also be resident in the application module 114 and made available for download via the network 110 (FIG. 1). An example scenario for sharing contacts (digital cards) between an application user and a non-user would entail the non-user scanning the QR code 914, 916 to download the application software. After downloading the application, the new application user only has the single contact received from the prior application user. In some embodiments, the new application user receives a prompt on their device 10 requesting permission for the application to sync all of the new user's native contacts to the application. At this stage, the synced contacts are added to the image 218 glossary (under a generic silhouette icon of a person), but they are non-application contacts resident on the device 10 until they are entered into the network 110 database 118. In some embodiments, the original native contacts are automatically formatted into application digital cards utilizing the limited information contained in the native contact entry. As such, the contacts are made available to the application user via a gesture over the respective image in the image 218 glossary as described herein. Once an application embodiment is downloaded onto an electronic device 10, all of the digital card creation and contact sharing and distribution functionalities are available to the user as disclosed herein.

Non-application users can also be invited to download the disclosed application embodiments via conventional text and/or email. As described herein, an application user can contact others through the application via any conventional format available on the particular electronic device 10. For contacts (or potentially new contacts) that are not current users of the application, the application user can send a standard invitation to others to download the application along with his/her digital card(s). For example, in some embodiments activation of any of the "Share" designated tags on the different displays will automatically send such an invitation to contacts that are not current application users and therefore do not have their contact data in the database 118. In some embodiments, a non-user may also enable a download of the application software through the network 110 via website 117 (FIG. 1).

In some embodiments, distributing and sharing digital cards is a simple press-n-swipe step. Once a sharing options page is open, a user can gesture and activate the distribution features disclosed herein. In some embodiments, a long-press gesture over any contact image automatically opens the digital card sharing display options described herein. For example, a long-press on another user's image 218 in the contact directory can automatically open a screen view such as 3V2 of FIG. 3 to facilitate digital card sharing.

Application users can easily update their contacts. A "User Card" tag 224 on the tool bar 221 provides quick access to the user's own digital cards. A gesture over this tag 224 opens the user's own digital cards and permits direct editing of the posted information (e.g. social media). After editing a digital card, the revised card is stored in the device 10 resident memory and the database 118. The updated digital cards can be sent over the network 110 directly to other application users that have that contact information in their application's address book. A user has the option to distribute and share the updated digital card with all of their contacts or to specifically selected contacts as disclosed herein. This allows a user to update any information on their own digital cards (e.g., change the picture, phone number, social media identifier, etc.) and provide the updated card(s) to other contacts with a simple gesture over a display prompt. In some embodiments, the application can be set to periodically check stored pages/digital cards for any updates and disseminate the latest updates to all contacts authorized to have the card.

Figure 10:
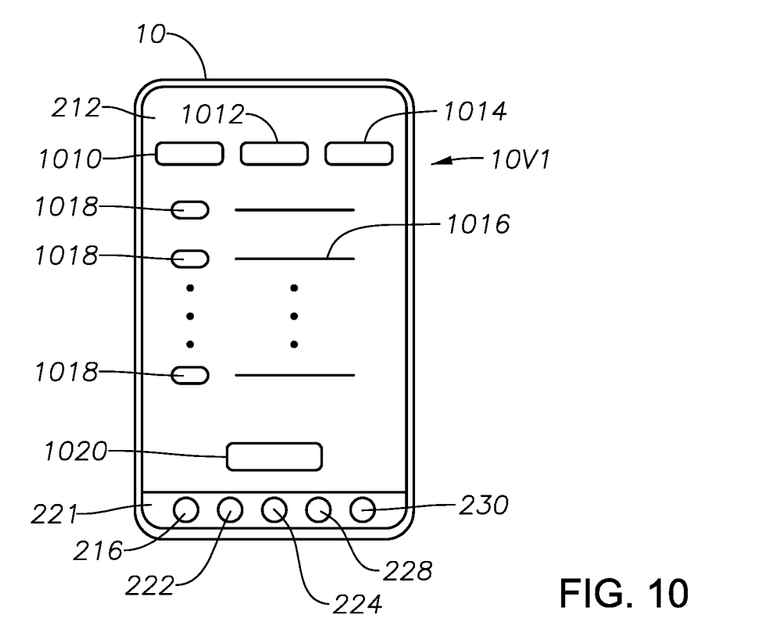
FIG. 10 shows a screen view of an application embodiment according to an example of the present disclosure.

In some embodiments, a "Settings" tag 228 on the tool bar 221 opens a screen display providing the user options to edit contact page/digital card data, manage digital card access, set/reset an application password, and change application settings. FIG. 10 shows a screen view 10V1 of a page to manage digital card access opened via a gesture over the Settings tag 228. From this page, a user can open the desired address directory (Social Card tag 1010, Business Card tag 1012, Private Card tag 1014) and selectively elect which contact(s) to remove from access to digital cards. For example, if the Business Card tag 1012 is enabled, the respective contact list 1016 is displayed, with each contact entry having its own sliding-switch tag 1018 to select the desired contact for Business Card access removal. A gesture over "Remove Access" tag 1020 completes the removal command and card removal occurs via the network 110. Activation of card removal will remove the respective digital card(s) from the selected contact's address book. In this manner, a user can selectively delete their contacts' access to his or her digital cards. Once access has been deleted to a particular contact, the user's digital card is automatically deleted from that contact's directory via the network 110. In some embodiments, a double-tap gesture over the Remove Access tag 1020 will provide a visual prompt on the display 212 for the user to confirm the removal of access for all contacts in the respective card directory, facilitating the quick removal of card access for all contacts in the directory if desired. Among the options provided to a user upon activating the Settings tag 228 is an option to build and edit any of the user's own digital cards. This feature allows a user to quickly and easily open their respective digital cards and directly edit the cards as desired. A user can delete their own digital card(s) as desired. Just as enabling the removal of all the contacts' access to a user's digital card via the Remove Access tag 1020 as described above, once a user deletes their own card it is deleted from access to all contacts. This is particularly useful if a user goes out of business, for example, and decides to delete the digital cards in everyone's contact directory that he or she has distributed to over the years.

Some embodiments provide a delayed digital card distribution functionality. The "send" tags of the disclosed embodiments can include application functionality that allows a user to send their digital cards to anyone who currently has their information resident in their native contacts. That is, if a user ever gave their information to another person, and that person still has the user's information in native contacts, the user likely wants that person to upgrade the native contact information into a fully functional application digital card. Some of the people that fit into this category (people that have the user's card in their native contacts) may be a person that the user does not have saved in their own contacts, native or otherwise. In such cases, an application embodiment will rely on the sending-user's own phone number to determine whether that phone number exists on a new user's synced contacts. The application will run a search on all other user's contacts and look for and find the sending-user's phone number. Once the application determines that the sending user's number exists on an application user's contacts, the sending user's card is sent to that person. As an example, John has Mary's phone number on his native device 10 contacts, but Mary does not have John's card on her contacts. Mary activates the application send tag that prompts "send to all people who currently have my number in their contacts." If John has the application downloaded on his device 10, then the application will recognize that there is a user, John, that has that number in his contacts and therefore Mary's digital card is sent to John. It could be that fifty people could have John's card but those fifty people do not have John in their contacts. If John has the application, John would receive the fifty cards, thereby converting his old native contacts with limited information to digital cards that are infused with extensive vital contact information. If John is not an application user, the application will still send the very same "send" signal, but it would not find John because he is not an application user and because John does not have the application contacts that the application can search through and find Mary's number.

As a further example, assume that the same fifty people, who John has on his native contacts, requested that their native contact information on others' devices be converted to application digital cards. The application, again would search all application users (via the network 110) to find who has the fifty numbers in their application contacts. This signal could be sent out continuously once a day. When John eventually downloads and opens the application, he will find that fifty of his contacts that he synced onto the application have already been converted into application digital cards. This is because on that day, a signal sent to search for those numbers was finally realized and John received all fifty digital cards. This functionality provides for automatic digital card population for potential application users.

Figure 11:
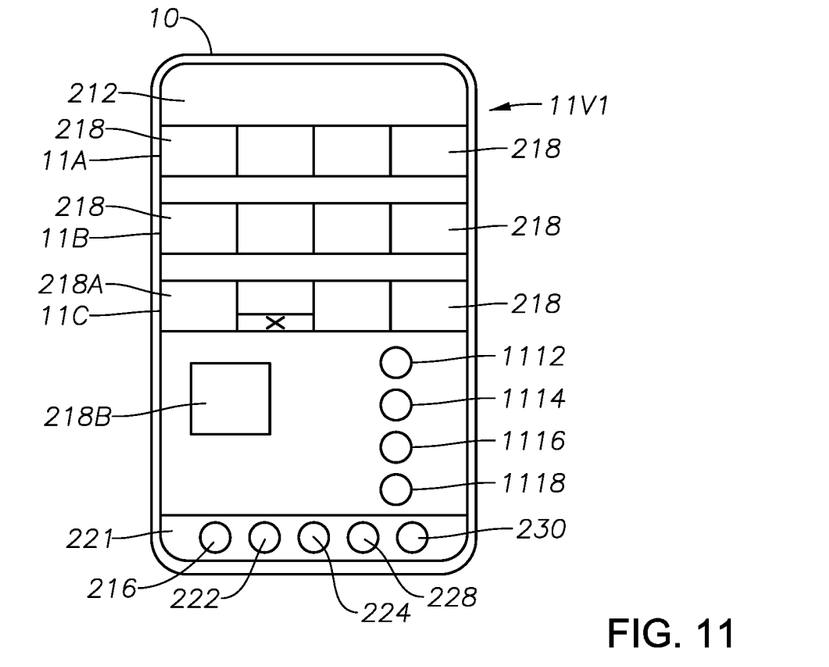
FIG. 11 shows a screen view of another application embodiment according to an example of the present disclosure.

Embodiments of this disclosure also provide a streamlined and miniaturized version contact register. FIG. 11 shows a screen view 11V1 of a "Recents/Surfing" page embodiment. A series of contact images 218 are displayed in rows 11A, 11B, 11C. The rows 11A, 11B, 11C display contact images from the contact image 218 glossary, but in smaller-sized pictures.

Some embodiments register Recent Calls and Recent Messaging. Unlike traditional Recents logs in conventional contacts, the Recents implementations of this disclosure do not incorporate a historical call log. The images 218 of the most recently received calls, including missed calls, appear on row 11B. For example, if a person calls ten times in 24 hours, only the last call is indicated by revealing the caller's image 218, along with the time the call was received. In this manner, since only the last call is depicted, a caller's image in row 11B is not duplicated, keeping the row concise by avoiding redundancy. Images 218 of missed calls in row 11B may include a visual indication of the missed call. The visual indication can be any discernible feature (e.g., highlighting, darkened border, change in coloration, a small badge, etc.). In some embodiments, the associated phone number is displayed with the image 218. For non-application users the image 218 is a silhouette icon of a person. For application users, the contact's image 218 is displayed. If no image is available, a generic silhouette icon of a person is displayed as the image 218. A user can gesture page left or right on the images 218 in the row 11B to view extended groupings.

The images 218 of the most recently received messages appear on row 11A. The recent messaging is viewed the same way that recent calls are viewed. A grouping of recent images 218 is displayed in row 11A. The row may page left or right to reveal other groupings of Recent Messages. Like Recent Calls, Recent Messages does not include a historical message log for all of the messages received. Only the last recent message is indicated via display of the messenger's image 218. Recent Message row 11A will reveal messages from all types of platforms, including but not limited to native text, WHATSAPP™, MESSENGER™, and any other available text/sms/messaging App. In some embodiments, each image 218 includes the icon of the messaging service from which the message was sent. Upon selecting that image/icon, that particular messaging app is opened, revealing the latest message to the user and enabling the user to respond to the latest message.

Row 11C mirrors the first row of the home page contact image 218 glossary (see row 218A in screen view 2V1 of FIG. 2). However, the first image 218A in row 11C is the device 10 owner's own image (i.e. user's own digital contact card picture), which is defaulted as the "featured" contact 218B in the lower section of the display 212. When a user gestures over an image 218 from row 11C, it becomes the featured contact 218B image and is depicted significantly larger than the original image 218 in row 11C above. For example, if the second image 218 in row 11C represents contact X and the user gestures over the image, contact X's image 218B appears (enlarged and "featured"). To the right of the featured contact 218B image is an array of icons 1112, 1114, 1116, 1118 in a matrix formation, which are all of the icons that appear on the featured contact's digital card. However, these are just icons and have no text or letters attached to them. These icons 1112, 1114, 1116, 1118 may include icons that relate to "Calling," "Texting," WHATSAPP™, MESSENGER™, "Email," GOOGLE™ Maps, PAYPAL™, VENMO™, or many others. From this page, application users can also import social media or messaging social media that is not necessarily included or uploaded to their digital cards. These embodiments provide this "Surfing" feature that allows a user to go to one place to see all of their social media without having to exit the application or go to other sites looking for social media icons. A gesture over any of the icons 1112, 1114, 1116, 1118 will take the user to that respective social media platform. When a user gestures the back button, the social media platform is exited and the user is brought back into the application, where he or she is free to "surf" and visit another selected social media platform or choose to go to other contact's social media platforms. This functionality allows a user to surf through their communication platforms, social media platforms, mapping/GPS platforms, and pay platforms as desired, all without ever leaving the application and all within a thumb-reach (keeping the user from having to reach across the device screen). The Surfing page can be opened via a double-tap gesture over the application icon 216.

Some application embodiments may be implemented with voice-command activation and operation. Conventional audio and voice-command software may be incorporated with the application software to enable a user to run the application, find, select contacts, open social media and messaging platforms, and share digital cards via verbal commands using the electronic device's 10 built-in microphone 11. Since the number of contacts in a user's contact directory represents a confined group, and each contact's digital cards contain all of that contact's social media URL or location information, simple voice commands can open up any contact's social media (e.g., a user can voice command social media such as FACEBOOK™). A user could simply state or command: "[APPLICATION], OPEN BARBRA SMITH'S FACEBOOK." The application will find Barbra's digital card(s), go to her FACEBOOK™ URL and direct that it be opened.

Some embodiments provide an invoicing and payment functionality. Each digital card (e.g. Social Card, Business Card) can have a payment application embedded therein, just like other social media applications (e.g., PAYPAL™, VENMO™, etc.). When building or creating a digital card as disclosed herein, the user can link the desired conventional payment application. When onboarding the payment application, the user will be prompted to indicate their payment application identifier on a particular field. This identifier data is not viewable by anyone other than the user.

Figure 12:
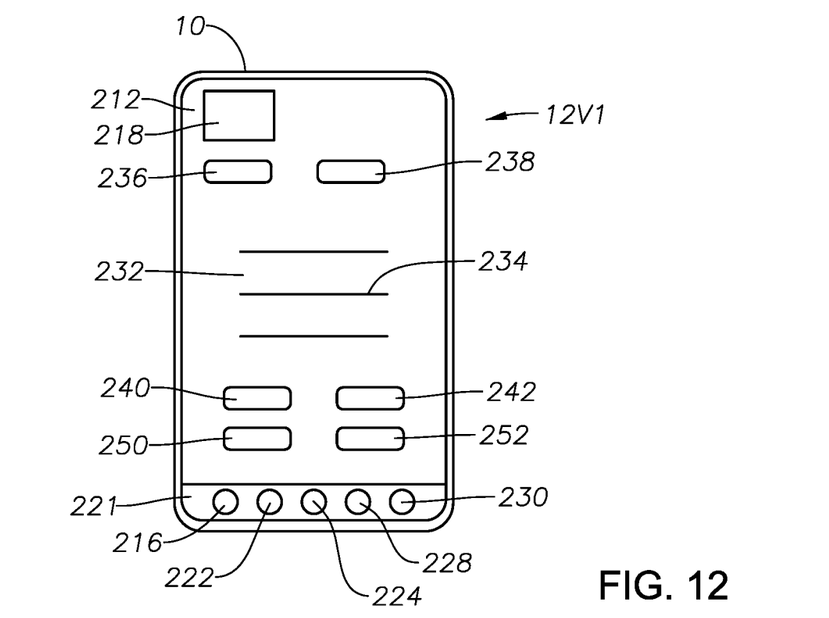
FIG. 12 shows a screen view of another application embodiment according to an example of the present disclosure.

FIG. 12 shows another screen view 12V1 of an embodiment of this disclosure. This screen view 12V1 is similar to screen view 2V4 of FIG. 2, showing an example digital Business Card or page embodiment. In this embodiment, the display 212 includes an additional "Pay" tag 250. The tag 250 may include the respective contact's name (e.g. "Pay Carlos Garcia"). Upon gesturing on this tag 250, the icon or social media identifier of the contact's payment application is displayed (in this example, Carlos' payment application entered on his digital card). If the user wanting to make payment to Carlos has the same payment application, the user can gesture to open the payment application and Carlos' account identifying information is already inserted. The application will provide the usual security requirements already in place with the respective payment platform. The user can then make a payment to Carlos. If the user does not have the same payment application as Carlos, a link to the respective application upload is displayed for quick download of the application directly to the user's device 10. After download, the user can pay Carlos.

For Business Cards, some application embodiments will add an additional functionality. The digital Business Cards provide a user the ability to directly invoice their contacts. An invoice may be sent by identifying a particular contact and gesturing an "Invoice" tag 252 on the display 212. The application includes a general form invoice that a user can fill out with information relating to the invoicing matter. In some embodiments, a user can select an invoice produced by another application as an attachment file. Upon gesturing a "send" prompt, the invoice is sent to the respective contact via the network 110.

Turning to screen view 8V2 in FIG. 8B, once issued as described above, an invoice lands in the contact's notification center, and the contact is alerted an invoice has been received. Display 212 section 860 shows the abbreviated entries 862 for each received invoice (e.g., name, phone, email). Upon gesturing over an entry 862, the respective invoice is opened for viewing. Once the digital invoice is opened, the user is prompted with three selection tags: "Pay", "Close", and "Delete." "Close" closes the window but leaves the invoice entry 862 pending in the notification center for payment at a later time. "Delete" deletes the entry 862, sending the invoice to trash where it can be recovered by the user if later desired. The trash bin can be cleared at any time to permanently remove trash files. "Pay" enables the payment as described above. All payed receipts can be saved in a repository unless the user wishes to delete them.

Embodiments of the disclosed application provide a number of advantages over conventional contact directories. Contact searching and identification is made easier, faster, and error-free. Once a contact is selected, a user can decide whether to contact and communicate with that person/entity or simply visit the contact's social media. Users are free to contact and communicate with contacts through the various means available in their digital cards, without having to exit and navigate to external sites. Users can surf through contact's digital cards and social media quickly and easily. If a user desires to communicate with a contact, native platforms are automatically opened and populated for streamlined communication. Users can easily create, access, edit, and update digital cards and profiles. Users can easily restrict and delete digital cards from access by others. Users can share and distribute contact information and digital cards efficiently across a large network of contacts. All of these functionalities can be performed within thumb's reach.

In light of the principles and example embodiments described and illustrated herein, it will be recognized that the example embodiments can be modified in arrangement and detail without departing from such principles. For example, alternative embodiments may include processes that use fewer than all of the disclosed operations, processes that use additional operations, and processes in which the individual operations disclosed herein are combined, subdivided, rearranged, or otherwise altered. Embodiments may be implemented as software constructs stored in a machine accessible storage medium, such as an optical disk, a hard disk drive, etc., and those constructs may take the form of applications, programs, subroutines, instructions, objects, methods, classes, or any other suitable form of control logic; such items may also be implemented as firmware or hardware, or as any combination of software, firmware and hardware, or any combination of any two of software, firmware and hardware. The term "processor" may refer to one or more processors. In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A system to manage digital data, comprising:
    an application configured to allow a user to create and control digital data for distribution to electronic mobile devices over a communication network, including to:
        enter digital image data for the distribution to the electronic mobile devices;
        enter digital card data for the distribution to the electronic mobile devices, the digital card data including social media identifier data and personal or business contact data;
        selectively allow access to entered digital image data and/or entered digital card data to others over the communication network;
        selectively remove access to entered digital image data and/or entered digital card data from others over the communication network;
    a software interface configured to visually display, via one or more display windows on each electronic mobile device linked over the communication network, the entered digital image data and/or entered digital card data;
    the software interface configured to;
        link to and visually display a social media page associated with the entered social media identifier data upon selection by a user from a display window on at least one of the electronic mobile devices,
    a display, on an electronic mobile device of a user, to
        display a glossary of images associated with calls and/or messages sent to the electronic mobile device;
        display the digital image data and/or digital card data associated with an image in the glossary upon selection of the image by the user, wherein the displayed data includes any social media identifier data associated with the respective digital card data.

2. The system of claim 1 wherein the software interface is configured to visually display a glossary, on a display window on the electronic mobile devices, of digital image data comprising images associated with users.

3. The system of claim 1 wherein the application is configured to allow a user to automatically remove access from everyone else on the communication network to the digital image data and/or digital card data entered by the user.

4. The system of claim 1 wherein the application is configured to allow a user to automatically allow access to everyone else on the communication network to the digital image data and/or digital card data entered by the user.

5. The system of claim 1 wherein the software interface is configured to visually display, on a display window on the electronic mobile devices, a keyboard and digital image data associated with an entry on the keyboard by a user.

6. The system of claim 5 wherein the digital card data associated with specific digital image data is displayed on the window on the electronic mobile devices upon selection by the user from the displayed digital image data.

7. The system of claim 1 wherein the software interface is configured to directly enable, upon selection by a user from the entered digital card data displayed on a window on the electronic mobile devices, other features resident on the respective mobile device including phone, email, and/or text messaging.

8. The system of claim 1 wherein the application is configured to trigger an indicator on an electronic mobile device of a user when the user is selected to receive the digital card data entered by another user.

9. The system of claim 1 wherein the software interface is configured to display, on an electronic mobile device of a user, a payment function identifier and/or an invoicing function identifier for selection by the user.

10. A method for managing digital data, comprising:
    providing an application configured to allow a user to:
        enter digital image data for distribution to electronic mobile devices over a communication network;
        enter digital card data for the distribution to the electronic mobile devices, the digital card data including social media identifier data and personal or business contact data;
        selectively allow access to entered digital image data and/or entered digital card data to others over the communication network;

selectively remove access to entered digital image data and/or entered digital card data from others over the communication network;

providing a software interface configured to visually display, via one or more display windows on each electronic mobile device linked over the communication network, the entered digital image data and/or entered digital card data;

wherein the software interface is configured to:

- link to and visually display a social media page associated with the entered social media identifier data upon selection by a user from a display window on at least one of the electronic mobile devices;
- display, on an electronic mobile device of a user, a glossary of images associated with calls and/or messages sent to the electronic mobile device;
- display the digital image data and/or digital card data associated with an image in the glossary upon selection of the image by the user, wherein the displayed data includes any social media identifier data associated with the respective digital card data.

11. The method of claim 10 wherein the application is configured to, upon election by the user:

- automatically remove access from everyone else on the communication network to the entered digital image data and/or entered digital card data; or
- automatically allow access to everyone else on the communication network to the entered digital image data and/or entered digital card data.

12. The method of claim 10 wherein the software interface is configured to directly enable, upon selection by a user from the entered digital card data displayed on a window on the electronic mobile devices, other features resident on the respective mobile device including phone, email, and/or text messaging.

13. The method of claim 10 wherein the software interface is configured to display, on an electronic mobile device of a user, a payment function identifier and/or an invoicing function identifier for selection by the user.

* * * * *